US008201521B2

(12) United States Patent
Shirley

(10) Patent No.: US 8,201,521 B2
(45) Date of Patent: Jun. 19, 2012

(54) ANIMAL ATTRACTING DEVICE

(76) Inventor: Bryan K. Shirley, Taylors, SC (US)

( * ) Notice: Subject to any disclaimer, the term of this patent is extended or adjusted under 35 U.S.C. 154(b) by 247 days.

(21) Appl. No.: 12/589,226

(22) Filed: Oct. 20, 2009

(65) Prior Publication Data

US 2011/0088634 A1    Apr. 21, 2011

(51) Int. Cl.
 *A01K 29/00* (2006.01)
(52) U.S. Cl. ............... 119/708; 119/711; 119/51.03
(58) Field of Classification Search ............ 119/51.03, 119/708, 702, 707, 709, 710, 711
See application file for complete search history.

(56) References Cited

U.S. PATENT DOCUMENTS

| 5,606,933 | A  | * | 3/1997  | Wilkins ............... 119/51.03 |
| 5,794,568 | A  | * | 8/1998  | Udelle et al. .............. 119/707 |
| 6,564,746 | B2 |   | 5/2003  | Burnham |
| 6,578,517 | B2 |   | 6/2003  | Borries |
| 6,591,779 | B1 | * | 7/2003  | Hoogland ............... 119/51.03 |
| 7,051,681 | B2 | * | 5/2006  | Pope ....................... 119/712 |
| 7,104,222 | B2 | * | 9/2006  | Tsengas .................. 119/711 |
| 7,191,732 | B2 |   | 3/2007  | Neal, Jr. |
| 7,296,538 | B1 |   | 11/2007 | Pridgen |
| 2002/0174838 | A1 | * | 11/2002 | Crane et al. ............ 119/707 |
| 2003/0213440 | A1 | * | 11/2003 | Kelly ..................... 119/708 |
| 2005/0039698 | A1 | * | 2/2005  | Pope ...................... 119/711 |
| 2005/0241595 | A1 | * | 11/2005 | Moulton ................. 119/711 |

OTHER PUBLICATIONS

Remmeer Ltd., web site print outs from http://www.remmeer.com/durable-kong-dog-chew-toys-p-1095.html for durable kong dog chew toys, visited Oct. 20, 2009, (2 pages).

* cited by examiner

*Primary Examiner* — Yvonne Abbott
(74) *Attorney, Agent, or Firm* — J. Bennett Mullinax, LLC

(57) ABSTRACT

An animal attracting device is provided. The animal attracting device may include a body that has an exterior body surface that has at least one recessed portion for the receipt of attractant so that the attractant may be deposited on the exterior body surface and the at least one recessed portion. An attachment member may also be included for attachment to a support member.

20 Claims, 6 Drawing Sheets

ANIMAL ATTRACTING DEVICE

FIELD OF THE INVENTION

The present invention relates generally to animal attracting devices and, more particularly, to animal attracting devices with recessed surfaces on the exterior thereof and into which can be deposited animal attractants such as food or other animal attracting substances.

BACKGROUND

Animal attracting devices, such as animal or wildlife feeders, typically contain feed or other attractants that dissipate over time, either due to the animals removing the attractant or the elements. However, several disadvantages exist among current animal attracting devices. In particular, in the case of many devices, animals are able to access and remove the attractant too quickly, requiring more frequent reloading of the attractant and providing fewer opportunities for the animals to engage the device. Furthermore, other animal attracting devices can be easily removed or disabled by animals. As such, there remains room for variation and improvement within the art, particularly, for providing a device for attracting animals in which animals will be less able to remove the attractant quickly and which will be less prone to having the attractant removed by the elements, permitting more time for the animals to engage the device and less frequent reloading of the attractant.

SUMMARY

Various features and advantages of the invention will be set forth in part in the following description, or may be obvious from the description, or may be learned from practice of the invention.

A device for attracting animals is provided that may have a body with an exterior body surface that has at least one recessed portion for the receipt of attractant, such as feed. Although not required, the body may have an interior body surface that defines a cavity within the body. The interior body surface may receive attractant, and the body may have a body opening that allows access to the cavity. The device may also have an attachment member for attachment to a support member.

These and other features and aspects of the present invention will become better understood with reference to the following description and appended claims. The accompanying drawings, which are incorporated in and constitute part of this specification, illustrate embodiments of the invention and, together with the description, serve to explain the principles of the invention.

DETAILED DESCRIPTION OF REPRESENTATIVE EMBODIMENTS

Figure 1:
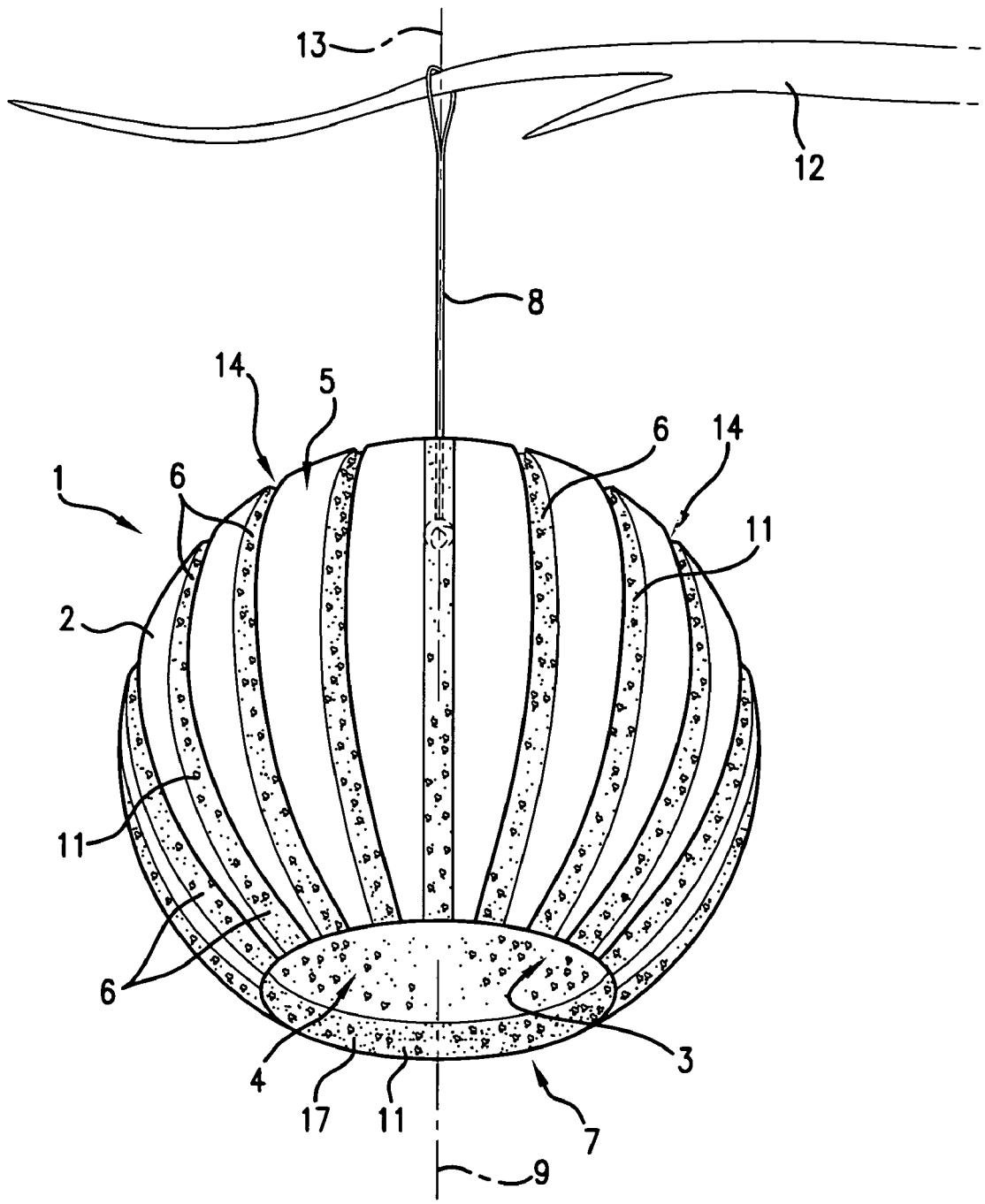
FIG. 1 is a perspective view of an animal attracting device in accordance with one exemplary embodiment with recessed portions that are channels.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

An animal attracting device 1 is provided that is capable of holding attractant 11 for an animal. The animal attracting device 1 may be constructed with a body 2 having one or more recessed portions 6 on an exterior body surface 5 into which attractant 11 may be deposited. The arrangement may be provided so that the attractant 11 is not quickly removed by the animal. As such, reloading of attractant 11 into or onto the animal attracting device 1 may be reduced. The animal attracting device 1 can be used in various embodiments for all manner of animals, whether considered wildlife or domesticated.

One exemplary embodiment of the animal attracting device 1 is illustrated in FIG. 1. Here, an animal attracting device 1 is shown and includes a body 2 and an attachment member 8 for attachment to a support member 12. Although not required, the body may have an interior body surface 3 that defines a cavity 4 inside of the body 2, although an interior body surface 3 and cavity 4 are not required. The interior body surface 3 is configured for the receipt of an attractant 11. In this regard, a user may apply attractant 11 to the interior body surface 3 and same may be retained thereon via adhesive properties of the attractant 11 until removed by the animal or otherwise dissipated naturally or by the elements. As discussed herein, the attractant 11 could take the form of an animal feed with a sufficient consistency and composition to be adhesive to the various surfaces of the animal attracting device 1. Those skilled in the art will be familiar with either commercially available animal feed fitting this description or will be capable of preparing this type of animal feed by mixing into dry feed, or using on their own, readily available ingredients such as peanut butter, honey, or molasses. Likewise, the attractant 11 could take the form of an odor or scent, including the many commercially available animal attracting scents that can be sprayed on or otherwise deposited on or near surfaces.

As noted, the animal attracting device 1 need not contain the interior body surface 3 that defines a cavity 4 and be a solid component, because the body 2 may also have an exterior body surface 5 that has at least one recessed portion 6 for the receipt of attractant 11. The body 2 may further have a body opening 7 defined by a peripheral body edge 17 located between the interior body surface 3 and the exterior body surface 5. The peripheral body edge 17 may be variously sized and shaped in accordance with different exemplary embodiments. For example, the peripheral body edge 17 may be a single, curved inner cylindrical surface that is parallel in relation to the body opening axis 9. Alternatively, the peripheral body edge 17 may be inclined in shape such that it is not parallel with the body opening axis 9. In this regard, the body opening 7 may become larger or smaller from the exterior to the interior of the body 2. Further, the peripheral body edge 17 need not have a single, uniform shape but different portions can be differently shaped. In accordance with certain exemplary embodiments, the length of the peripheral body edge 17 in the direction extending along the body axis 13 may be from 0.01-0.25 inches, from 0.25-0.5 inches, from 0.5-1.0 inches, from 1.0-2.0 inches, or up to 5 inches.

The body opening 7 may be adjacent the cavity 4 and permits an animal to reach attractant 11 located on the interior body surface 3. The animal attracting device 1 also has an attachment member 8 for attaching the animal attracting device 1 to a support member 12 so that the animal attracting device 1 may be suspended or otherwise removably secured. By configuring the animal attracting device 1 in this manner, users can deposit attractant 11 into both the cavity 4 and in the recessed portion 6 of the exterior body surface 5 and suspend the animal attracting device 1 from the ground or otherwise removably secure it, preventing animals from removing the attractant 11 too quickly, thereby permitting more time for the animals to engage the animal attracting device 1 while feeding and requiring less frequent reloading or reapplication of the attractant 11. Moreover, by suspending the animal attracting device at an appropriate height, the animal attracting device 1 can sway and move in various directions when agitated by an animal, making it more difficult for the animal to successfully remove the attractant 11.

The animal attracting device 1 may be constructed from any readily-useable material typically employed for construction of such devices or other similar wildlife feeders, such as plastic. In one preferred embodiment, the animal attracting device 1 is substantially made of a weather resistant and easily moldable material, such as plaster or plastic. As used herein, the term "substantially made of a weather resistant and easily moldable material, such as plaster or plastic," refers to the animal attracting device 1 having a substantial portion of its composition as a weather resistant and easily moldable material, such as plaster or plastic, whether or not the animal attracting device 1 also has other composite materials that are not as weather resistant or as easily moldable as plaster, plastic or other similar materials.

Figure 2:
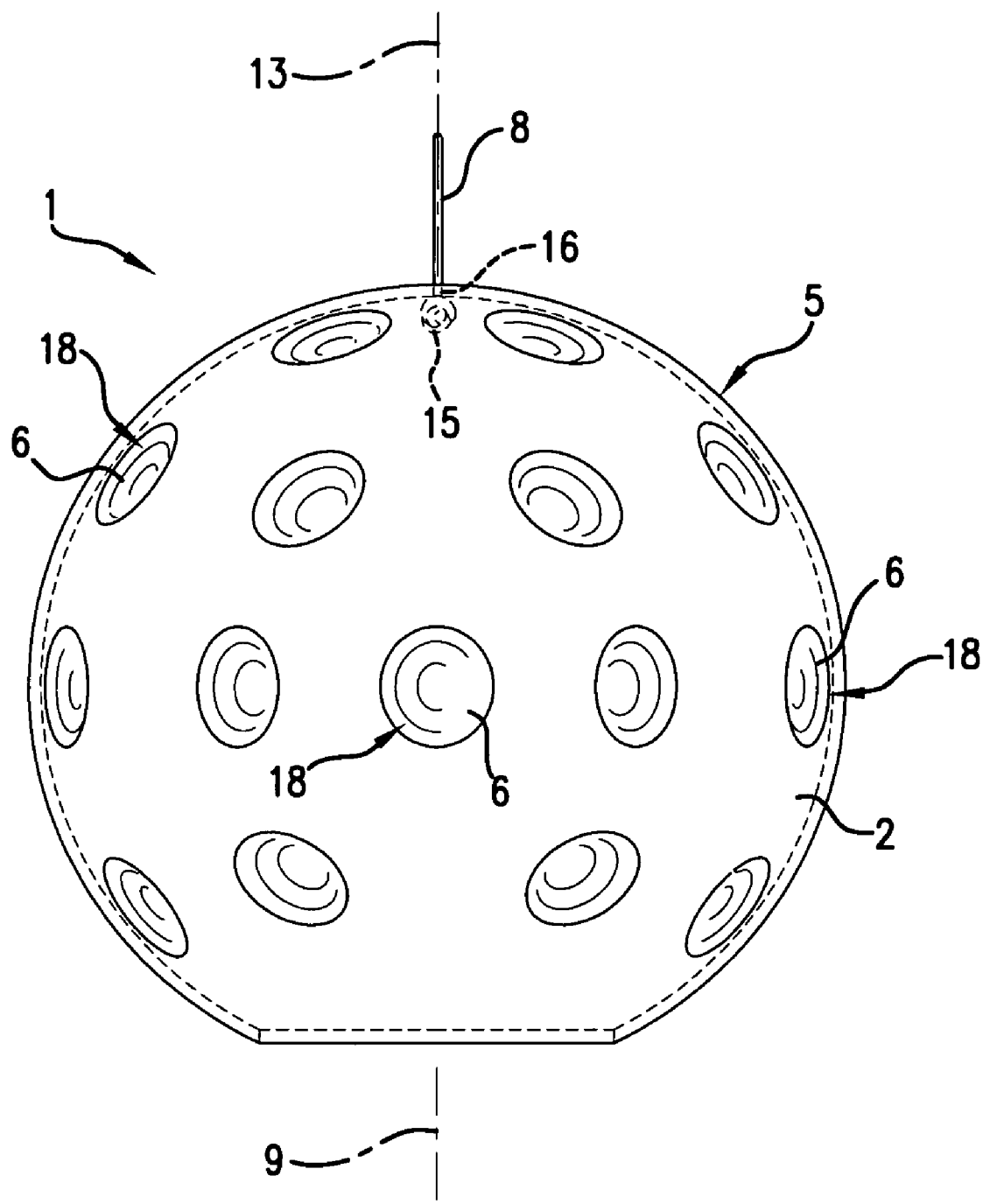
FIG. 2 is a side view of an animal attracting device with recessed portions that are dimples in accordance with a different exemplary embodiment.

The configuration and orientation of the one or more recessed portions 6 can vary. In accordance with one exemplary embodiment shown in FIG. 2, the recessed portions 6 are dimples 18. Another exemplary embodiment of the animal attracting device 1 shown in FIGS. 1, 3, 4, 7 and 8 features recessed portions 6 that are channels 14 extending substantially across the exterior body surface 5. The exterior body surface 5 can have a plurality of recessed portions 6 that can receive attractant 11. In accordance with yet another exemplary embodiment, only a single recessed portion 6 may be defined on the exterior body surface 5 for the receipt of attractant 11. Any number or configuration of recessed portions 6 can be employed, though a greater number of recessed portions 6 may enable the animal attracting device 1 to have deposited on and in it greater amounts of attractant 11 and may make it more time-consuming for the animals engaging the animal attracting device 1 to remove the attractant 11.

It is to be understood that the configurations of the recessed portions 6 illustrated in the figures are only exemplary and that other are possible. For example, the recessed portions 6 may be variously shaped in other arrangements and can have cross-sectional shapes that are the same about their entire depth or are different about their depth into the body 2. Various embodiments exits in which from 1 to 5, from 5 to 10, from 10 to 15, from 15 to 20, or up to 200 recessed portions 6 are present on the body 2. When configured as being channels 14 and in the case of a spherical shaped body 2, the recessed portions 6 may each extend along an arc length from 120°-180°, from 30°-90°, from 90°-120°, or up to 340°. All of the channels 14 may extend the same arc length or may extend different arc lengths. The arc lengths may extend in the direction of the body axis 13 such that the channels 14 extend across the body 2 in the direction from the body opening 7 to the attachment member 8. However, in certain arrangements the channels 14 may extend across the body 2 such that the channels 14 extend in an arc length that circles or partially circles the body axis 13 so that the channels 14 are in effect oriented 90° from their positions shown in FIG. 1. All of the channels 14 are non-intersecting with one another in certain embodiments. Furthermore, the channels 14 can be configured to intersect with each other.

Figure 3:
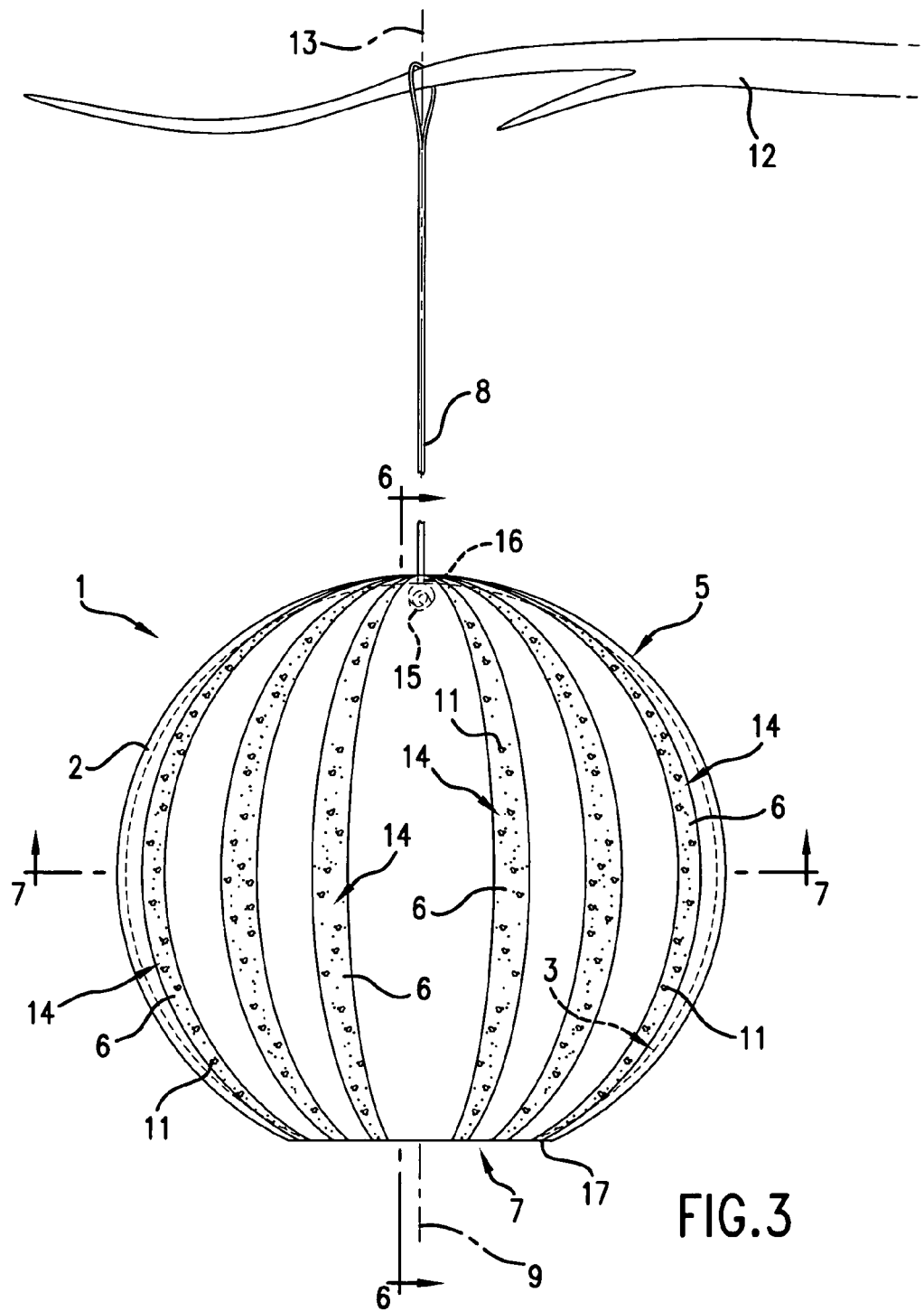
FIG. 3 is a side view of the animal attracting device of FIG. 1.

Referring to FIGS. 1 and 3, in one exemplary embodiment, the exterior body surface 5 on opposite sides of the channel 14 in the direction extending away from the body opening 7 is convex in shape, just as the interior body surface 3 is concave in shape. The cross-sectional shape of the channel 14 and the exterior body surface 5 on opposite sides of the channel 14 may be more clearly viewed with reference to FIG. 7. As shown in cross-section, the channel 14 includes a bottom that may be concave in shape. In other arrangements, the cross-sectional shape of the channel 14 may be straight. The sides of the channel 14 extending from the bottom of the channel 14 may be generally linear or curved. The channel 14 overall may have a concave cross-sectional shape. However, it is to be understood that other exemplary embodiments are possible in which the cross-sectional shape of the channel 14 is not concave but may instead be square, rectangular, or triangular shaped in other arrangements. The cross-sectional shape of the channel 14 may be variously shaped in yet other embodiments. Further, all of the channels 14 may have the same cross-sectional shape or they may be different from one another in accordance with other exemplary embodiments. For example, half of the channels 14 may have a first cross-sectional shape while the other half of the channels 14 may have a second cross-sectional shape.

The channel 14 may extend across the exterior body surface 5 in the direction from the body opening 7 to the attachment member 8, with the bottom of the channel 14 running from the body opening 7 to the attachment member 8 being convex in shape and with the exterior body surface 5 on opposite sides the channel 14 being convex in shape. The channel 14 may begin at a location adjacent the cavity 4 and end at a location adjacent the attachment member 8. In this regard, the channel 14 may engage the body cavity 4 such that the channel 14 extends to and engages the peripheral body edge 17. The channel may additionally or alternatively extend to and engage the attachment member 8. In other arrangements, the channel 14 may be located a distance from 0.1 inches to 3 inches from the peripheral body edge 17 and/or the attachment member 8. The channel 14 may be arranged so that the body axis 13 and the body opening axis 9 do not pass through the channel 14. Although described with respect to a channel 14, it is to be understood that the description may include all of the various channels 14 of the animal attracting device 1 if a plurality of channels 14 are included.

Referring now to FIGS. 1, 3, 4, 7 and 8, in one exemplary embodiment, the exterior body surface 5 of the animal attracting device 1 is substantially spherical in shape and the body opening 7 is circular in shape. The body opening 7 has a body opening axis 9 that is coaxial with a body axis 13, and the recessed portions 6 are channels disposed about the exterior body surface 5 so as to be located along an arc length of 360° about the body axis 13. In other arrangements, the channels 14 need not be disposed a complete 360° about the body axis 13. For example, the channels 14 may be disposed up to 90°, up to 120°, up to 180° or up to 270° about the body axis 13. The channels 14 may be located right next to one another about the body axis 13, or may be spaced from one another some distance. For example, the channels 14 may be spaced from 10° to 90° from one another (center on center) about the body axis 13 in accordance with certain exemplary embodiments.

Figure 5:
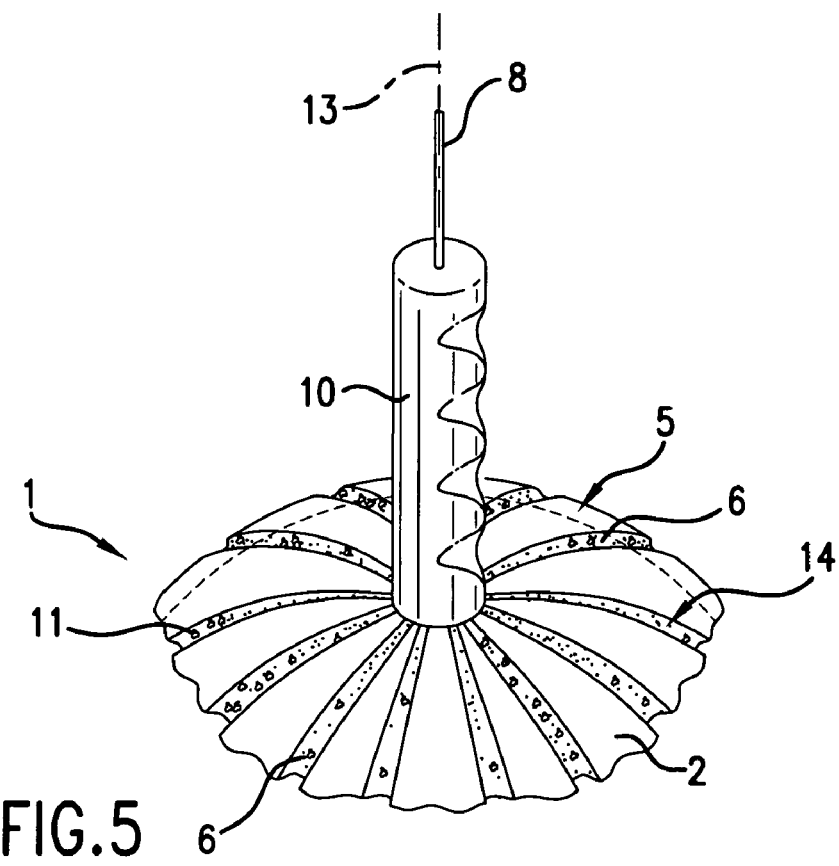
FIG. 5 is a partial perspective view of the animal attracting device having a handle in accordance with one exemplary embodiment.

As shown in FIG. 5, in another exemplary embodiment, the animal attracting device 1 has a handle 10 extending from the exterior body surface 5 so that the animal attracting device 1 can be held by a user while attractant 11 is deposited into and on the animal attracting device 1. The handle 10 may be integrally formed with the body 2 or may be a separate piece that is subsequently attached thereto. The attachment member 8 may extend through the handle 10 or may be located separate from and not contacting the handle 10. In accordance with one exemplary embodiment, the attachment member 8 may be attached to the handle 10 and not contacting the body 2. In this regard, the handle 10 functions to attach the body 2 and attachment member 8 to one another. The handle 10 may be variously shaped. For example, the handle 10 may be cylindrically shaped, hook shaped, or hoop shaped in various embodiments. Finger gripping indentions may be present on the handle 10 in certain embodiments.

The animal attracting device 1 may be arranged so that the body axis 13 extends through the attachment member 8, handle 10, and the body opening axis 9 so that the center of the body opening 7, the attachment member 8, and the handle 10 have a common axis 13 extending therethrough. In other arrangements, the body axis 13 and the body opening axis 9 may be misaligned so that these two axes 13 and 9 are not co-axial. In other configurations, the handle 10 (if present) and the attachment member 8 are located so that the body axis 13 does not extend therethrough.

Figure 4:
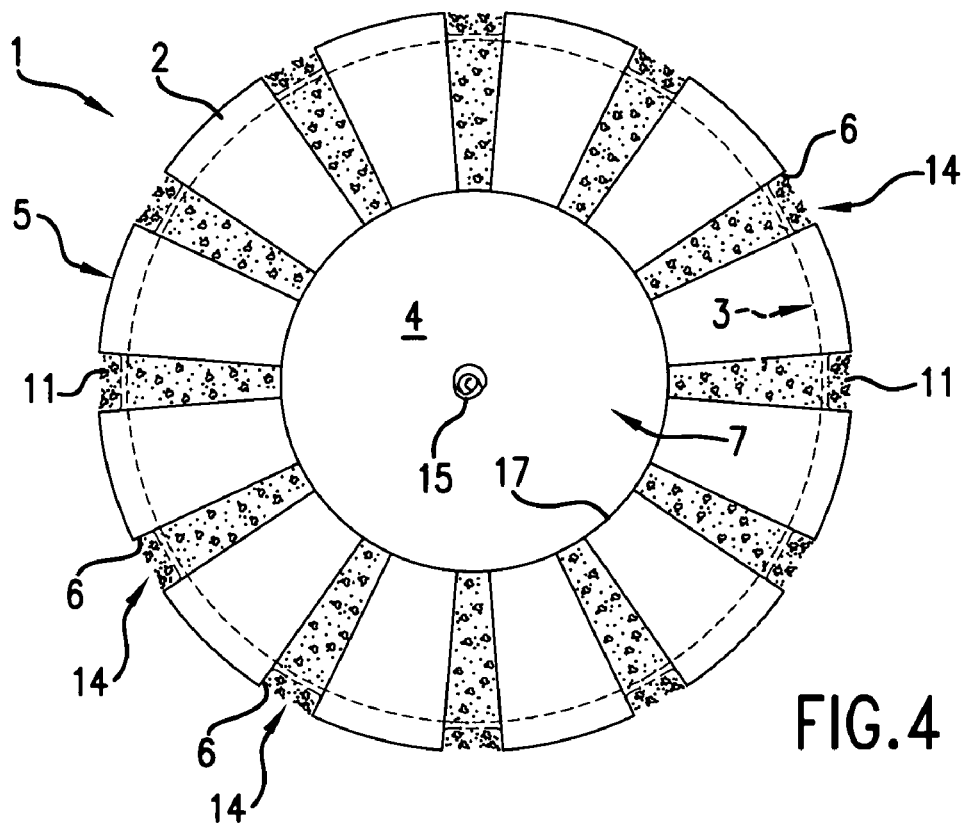
FIG. 4 is a bottom view of the animal attracting device of FIG. 1.
Figure 6:
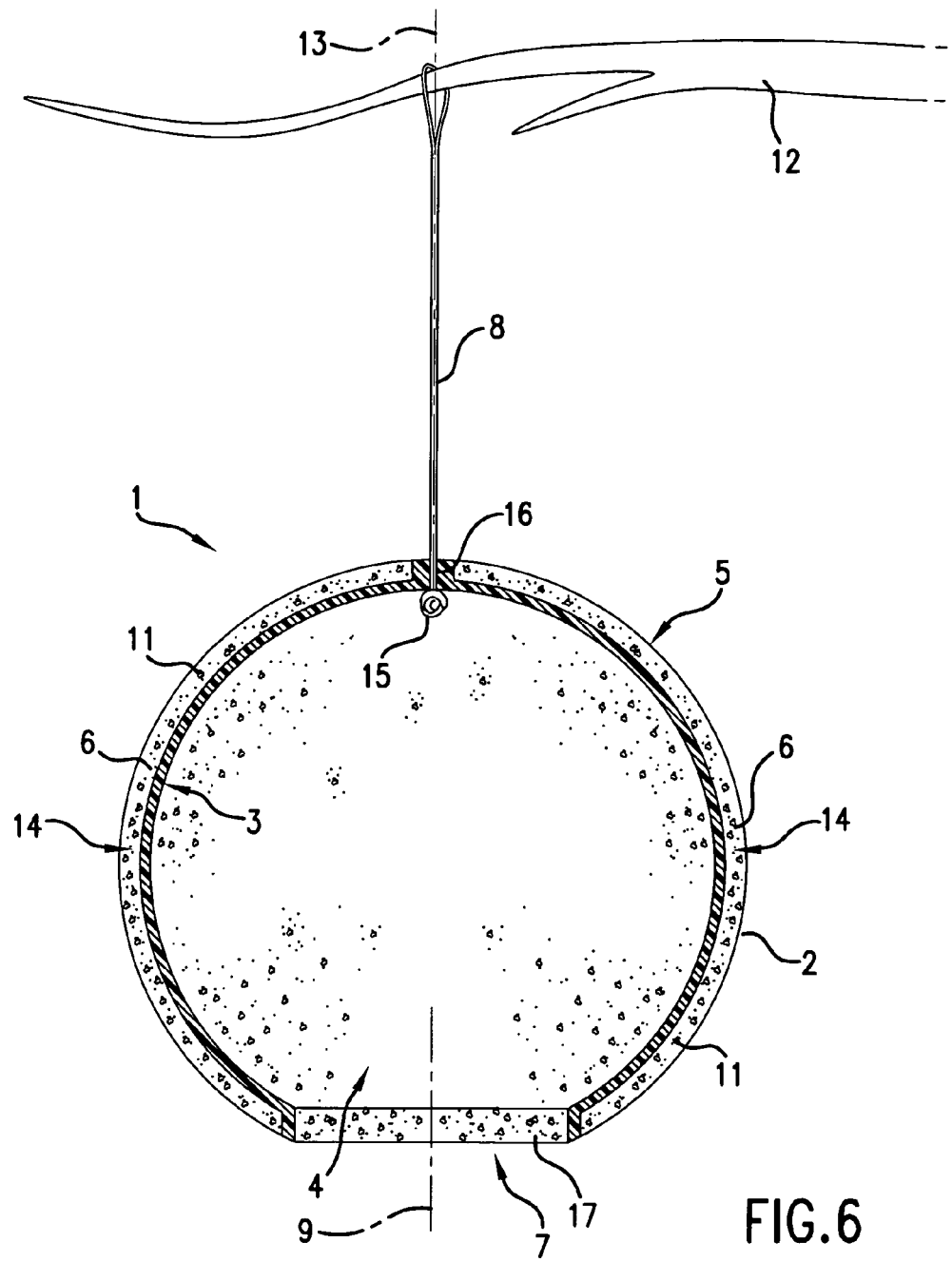
FIG. 6 is a cross-sectional view along line 6-6 of FIG. 3.
Figure 7:
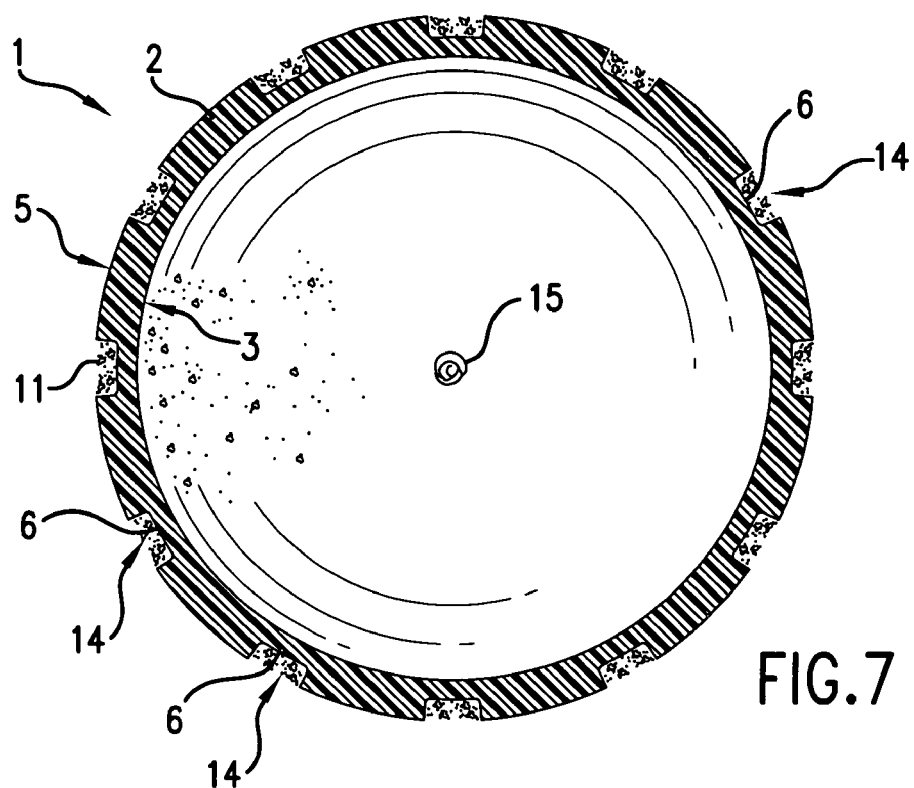
FIG. 7 is a cross-sectional view along line 7-7 of FIG. 3.

Referring now to FIG. 6, in one exemplary embodiment the attachment member 8 extends from the interior body surface 2, such that the attachment member 8 can be attached to a support member 12. The attachment member 8 may be provided in a variety of manners to allow the body 2 to be attached to the support member 12. The attachment member 8 should allow for the animal attracting device 1 to be substantially suspended from the ground or otherwise attached so that animals or other elements engaging the animal attracting device 1 cannot easily remove the animal attracting device 1, and so that swaying or pendulum movement of the animal attracting device 1 will make it more difficult for animals to easily remove attractant 11. By way of examples, the attachment member 8 can take the form of a rope, chain, hook, or an elastic band, and the support member 12 can take the form of a pole or a tree. In one exemplary embodiment, the attachment member 8 is a rope with one end knotted, such that the knotted end 15 remains in the cavity and is a sufficient size such that it will not pass through an attachment member opening 16. In this manner, the attachment member 8 is secured to the interior body surface 3 when the body 2 is suspended from the support member 12. This arrangement is illustrated in FIGS. 4, 6 and 7 in which the attachment member 8 has a knotted end 15 that engages the interior body surface 3 and is sufficiently sized so as to not be able to be pulled through the attachment member opening 16.

Figure 8:
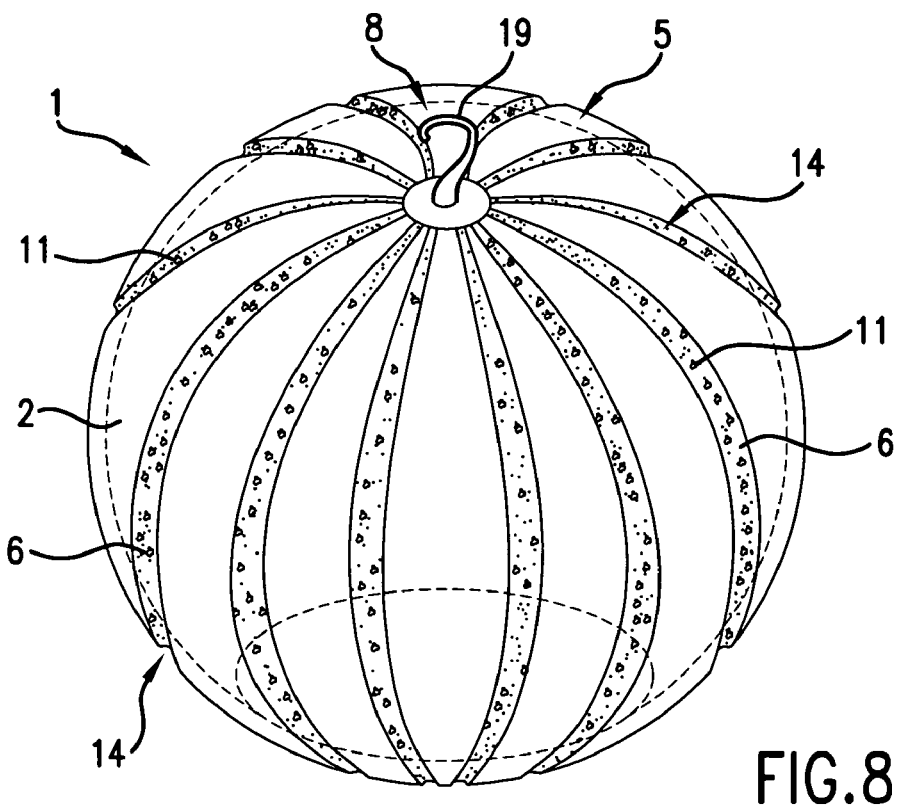
FIG. 8 is a perspective view of an animal attracting device with an attachment member that is a hook in accordance with another exemplary embodiment.

FIG. 8 illustrates an alternative exemplary embodiment in which the attachment member 8 is a hook 19. The hook 19 may be made out of a metal such as aluminum or steel, or the hook 19 can be composed of plastic. The hook 19 and the body 2 may be made out of different materials or may be made out of the same materials. The hook 19 can be attached to the exterior body surface 5 in a variety of manners. For example, the hook 19 may be screwed into the body 2 to effect attachment, or the hook 19 and body 2 can be formed integrally with one another. The hook 19 can be placed onto a support member 12 to effect hanging of the animal attracting device 1. Further, a rope or line may extend from the support member 12, and the hook 19 can be attached to the rope or line in order to suspend the animal attracting device 1 at a desired location. It is to be understood, however, that the attachment member 8 may be variously configured in accordance with other exemplary embodiments.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An animal attracting device, comprising:
   a body having an exterior body surface that has at least one recessed portion for the receipt of attractant, such that attractant can be deposited on said exterior body surface and in said at least one recessed portion, wherein said recessed portion has a depth that extends into said body towards a center of said body, wherein said exterior body surface and said body defining said recessed portion are located on an exterior of said body, and wherein said exterior body surface and a bottom of said recess portion face away from the center of said body;
   an attachment member for attachment to a support member; and
   attractant located in said recess portion and engaging said bottom portion of said recess portion.

2. The animal attracting device of claim 1, wherein said body has an interior body surface that defines a cavity within said body, wherein said body has a body opening that allows access to said cavity such that attractant can be deposited inside said cavity and on said interior body surface.

3. An animal attracting device, comprising:
   a body having an exterior body surface that has at least one recessed portion for the receipt of attractant, such that attractant can be deposited on said exterior body surface and in said at least one recessed portion; and
   an attachment member for attachment to a support member;
   wherein said body has an interior body surface that defines a cavity within said body, wherein said body has a body opening that allows access to said cavity such that attractant can be deposited inside said cavity and on said interior body surface;
   wherein said exterior body surface on opposite sides of said channel in the direction extending away from said body opening is convex in shape.

4. An animal attracting device, comprising:
a body having an exterior body surface that has at least one recessed portion for the receipt of attractant, such that attractant can be deposited on said exterior body surface and in said at least one recessed portion; and
an attachment member for attachment to a support member;
wherein said body has an interior body surface that defines a cavity within said body, wherein said body has a body opening that allows access to said cavity such that attractant can be deposited inside said cavity and on said interior body surface;
wherein the entire said interior body surface is concave in shape.

5. An animal attracting device, comprising:
a body having an exterior body surface that has at least one recessed portion for the receipt of attractant, such that attractant can be deposited on said exterior body surface and in said at least one recessed portion; and
an attachment member for attachment to a support member;
wherein said body has an interior body surface that defines a cavity within said body, wherein said body has a body opening that allows access to said cavity such that attractant can be deposited inside said cavity and on said interior body surface;
wherein said body defines an attachment member opening, and wherein said attachment member is secured to said body inside said cavity and extends from said cavity through said attachment member opening to said exterior body surface.

6. An animal attracting device, comprising:
a body having an exterior body surface that has at least one recessed portion for the receipt of attractant, such that attractant can be deposited on said exterior body surface and in said at least one recessed portion; and
an attachment member for attachment to a support member;
wherein said body has an interior body surface that defines a cavity within said body, wherein said body has a body opening that allows access to said cavity such that attractant can be deposited inside said cavity and on said interior body surface;
wherein said exterior body surface has a plurality of recessed portions for the receipt of attractant.

7. The animal attracting device of claim 6, wherein said recessed portions are dimples disposed across said exterior body surface.

8. The animal attracting device of claim 6, wherein said recessed portions are channels that extend across said exterior body surface in the direction from said body opening to said attachment member.

9. The animal attracting device of claim 8, wherein said exterior body surface is substantially spherical in shape, and wherein said body opening is circular in shape and has a body opening axis that is coaxial with an axis of said body, wherein said channels are disposed about said exterior body surface so as to be located along an arc length of 360° about said axis of said body.

10. An animal attracting device, comprising:
a body having an exterior body surface that has at least one recessed portion for the receipt of attractant, such that attractant can be deposited on said exterior body surface and in said at least one recessed portion; and
an attachment member for attachment to a support member;
wherein said at least one recessed portion is a channel extending substantially across said exterior body surface.

11. An animal attracting device, comprising:
a body having an exterior body surface that has at least one recessed portion for the receipt of attractant, such that attractant can be deposited on said exterior body surface and in said at least one recessed portion; and
an attachment member for attachment to a support member;
wherein said at least one recessed portion is a dimple.

12. An animal attracting device, comprising:
a body having an exterior body surface that has at least one recessed portion for the receipt of attractant, such that attractant can be deposited on said exterior body surface and in said at least one recessed portion;
an attachment member for attachment to a support member; and
a handle extending from said exterior body surface from which said animal attracting device can be held while attractant is applied to said animal attracting device.

13. An animal attracting system, comprising:
a body having an interior body surface and defining a cavity, wherein said body has an exterior body surface having a plurality of channels extending along said exterior body surface, wherein said body has a peripheral body edge that defines a body opening into said cavity;
an attachment member for use in attaching said body to a support member; and
attractant having a sufficient consistency and adhesiveness to be applied to and retained by said interior body surface and to be applied to and retained in said channels.

14. The animal attracting system of claim 13, wherein said body is substantially spherical in shape.

15. The animal attracting system of claim 13, further comprising a handle attached to said body and extending from said exterior body surface for use in being held in order to assist in applying said attractant into said channels and onto said interior body surface.

16. The animal attracting system of claim 13, wherein said attachment member is a hook.

17. The animal attracting system of claim 13, wherein said channels extend across said exterior body surface in the direction from said body opening to said attachment member, wherein the bottoms of said channels are convex in shape and wherein said exterior body surface on opposite sides of each of said channels is convex in shape.

18. The animal attracting system of claim 17, wherein said body opening is circular in shape and has a body opening axis that is coaxial with an axis of said body, wherein said channels are disposed about said exterior body surface so as to be located along an arc length of 360° about said axis of said body.

19. The animal attracting system of claim 13, wherein the entire said interior body surface is concave in shape.

20. A wildlife attracting system, comprising:
a body having an interior body surface that is concave in shape and that defines a cavity, wherein said body has an exterior body surface that has a plurality of channels, wherein said body has a peripheral body edge located between said interior body surface and said exterior body surface that defines a body opening into said cavity, wherein said body has an axis that extends through the center of said body opening, wherein said channels are disposed about said exterior body surface so as to be located along an arc length of 360° about said axis;

an attachment member attached to said body and through which said axis of said body extends, wherein said attachment member is for use in attaching said body to a support member, wherein said channels extend from a location adjacent said peripheral body edge to a location adjacent said attachment member;

attractant located in said channels and located on said interior body surface.

* * * * *